United States Patent
Varian

(10) Patent No.: US 6,724,826 B1
(45) Date of Patent: Apr. 20, 2004

(54) METHOD AND APPARATUS FOR IMPROVING THE IMAGE QUALITY OF TRANSMITTED VIDEO SIGNALS VIA PRE-FILTERING

(75) Inventor: George R. Varian, Palo Alto, CA (US)

(73) Assignee: Ampex Corporation, Redwood City, CA (US)

( * ) Notice: Subject to any disclaimer, the term of this patent is extended or adjusted under 35 U.S.C. 154(b) by 0 days.

(21) Appl. No.: 09/512,776

(22) Filed: Feb. 25, 2000

(51) Int. Cl.$^7$ .................................................. H04B 1/66
(52) U.S. Cl. ..................................................... 375/240.29
(58) Field of Search ............................. 375/240, 240.01, 375/240.02, 240.03, 240.15, 240.25, 240.26, 240.27, 240.28, 240.29; 382/261; 348/416.1, 417.1, 418.1, 419.1; H04B 1/66

(56) References Cited

U.S. PATENT DOCUMENTS

| | | | | |
|---|---|---|---|---|
| 5,216,496 A | * | 6/1993 | Miyomoto et al. ........... | 358/41 |
| 6,028,965 A | * | 2/2000 | Normile ...................... | 382/250 |
| 6,137,835 A | * | 10/2000 | Yamashita et al. .......... | 375/240 |
| 6,269,123 B1 | * | 7/2001 | Fujishiro et al. ....... | 375/240.29 |
| 6,335,990 B1 | * | 1/2002 | Chen et al. ................. | 382/261 |

\* cited by examiner

*Primary Examiner*—Tung T. Vo
(74) *Attorney, Agent, or Firm*—George B. Almeida; Ralph L. Mossino; Joel D. Talcott

(57) ABSTRACT

A method and apparatus is disclosed which minimizes the visual artifacts normally generated when images are compressed for transfer through very narrow band channels such as, for example, the Internet. To this end, the images are pre-filtered and then scaled down prior to compression using a two dimensional spatial impulse filter with good pulse fidelity rather than flat pass bands, rapid cutoff at high frequency and minimal impulse response width. The impulse filter preferably is operated at the 6 db point down about 0.6 to 0.9 of the output image spatial band edge, thereby removing visible aliases in the images while compromising between subjective sharpness and total picture entropy.

30 Claims, 3 Drawing Sheets

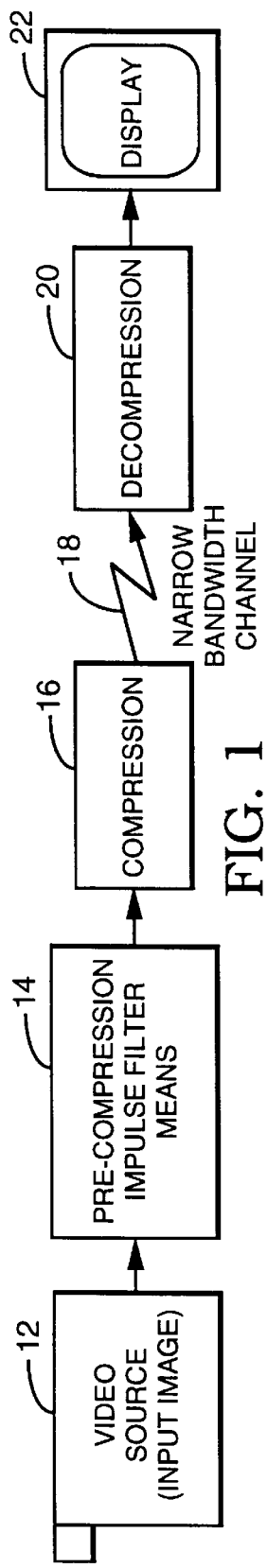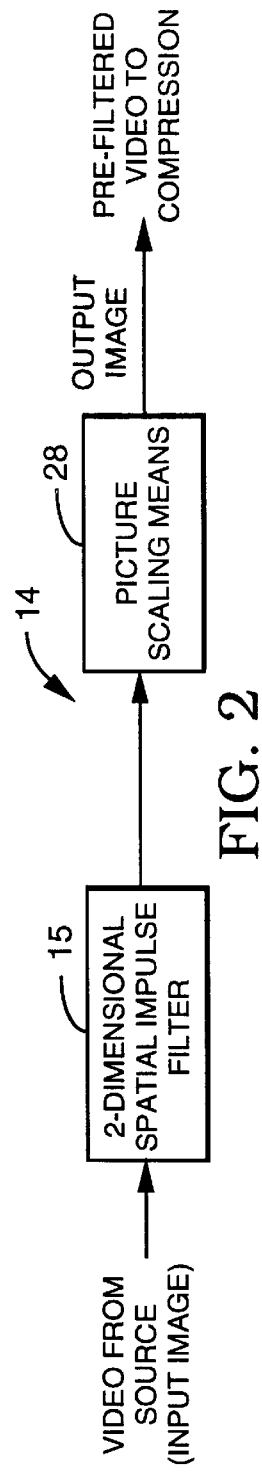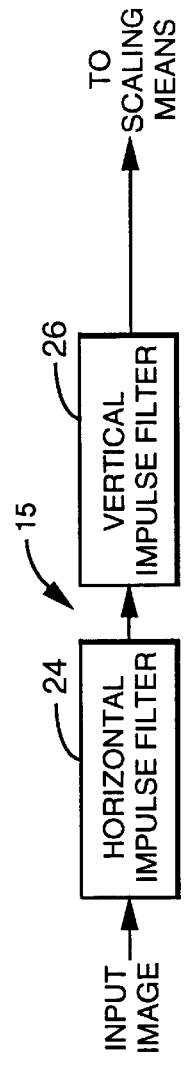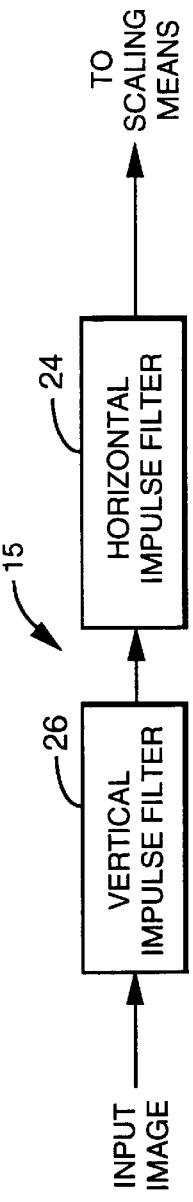

METHOD AND APPARATUS FOR IMPROVING THE IMAGE QUALITY OF TRANSMITTED VIDEO SIGNALS VIA PRE-FILTERING

FIELD OF THE INVENTION

The present invention is related to image compression/decompression systems, and more particularly to a compression/decompression system for improving the perceived image quality of a video signal and the like, being transmitted from a wide bandwidth system to a narrow bandwidth that is, lower bit rate, system.

BACKGROUND OF THE INVENTION

Video compression methods used on the Internet today use block transform coding similar to the coding scheme set by the Motion Picture Experts Group (MPEG). To this end, blocks of pixels from the representing image, or the difference from a previous image, are transformed. The transformed components are then rounded so as to require fewer bits to encode them. In the process of decoding, the blocks of rounded components are back transformed and used to reconstruct an approximation of the original image. To achieve the very high rates of compression required for the broadcast of video over the Internet, most of the transform components must be rounded to zero. The highest frequency components are zeroed out first. However, the result of setting non-zero transform components to zero does more than just reduce the image resolution, it also causes transition at the block edges in the decoded image. This blockiness becomes disturbing in Internet video.

The use of non-blocked encoding schemes such as sub-band coding avoid the blockiness but require more computer power to encode and decode the signals, precluding their use on the Internet. Another approach used on the Internet to reduce blockiness is to send frame updates less often. This results in a jerky video signal which also is objectionable.

Pre encoding filtering is provided to remove visually unimportant frequencies and particularly those frequencies that generate alias frequencies at the reduced size image that will be viewed on, for example, the Internet. Traditionally video filtering has been done with sharp cutoff filters that separate the pass band from the stop band. Such filters are used in digital television to remove components above half the sample frequency which cause unwanted alias frequencies in the video band. Flat pass bands are desired so that multiple passes of the video signal through equipment using such filters does not degrade the signal. However, sharp cutoff filters have a ringing impulse response. The resulting filter rings are detrimental to the encoding process since the encoder must encode both the feature and the ring associated with the feature, since the ring may not be in the same block as the feature. A ring associated with a feature is an artifact of filtering and reduces the perceived image quality.

Accordingly, it would be highly desirable to provide a video compression technique for use on the Internet, and other comparable transmission mediums, which minimizes the visual artifacts which presently are generated when video images are compressed for transmission through very narrow band channels, such as used on the Internet.

SUMMARY OF THE INVENTION

The present invention provides a method and associated apparatus for overcoming the shortcomings of the prior art compression schemes of previous mention presently in use for example on the Internet.

To this end, it is an object and associated advantage of the present invention to pre-filter the video image so as to improve the perceived image quality of, for example, Internet video signals when using typical Internet video coding/decoding (codec) systems.

It is another object and associated advantage of the present invention to provide the pre-filtering process prior to the processes of sizing and encoding the video signal, using a gaussian-like filter.

Another object and associated advantage of the invention is to provide the pre-encoding filtering with a two dimensional spatial impulse filter which has good pulse fidelity, rapid cutoff at high frequency and minimal impulse response width.

A still further object and associated advantage of the present invention is to provide a gaussian type pre-filter which removes alias frequencies in the video band without producing ringing.

A further object and associated advantage of the invention comprises removing spatial frequencies corresponding to the higher order discrete cosine transform components prior to the compression process to prevent the occurrence of blocky artifacts and loss of resolution which inherently are caused by setting the components to zero.

Accordingly, the present invention comprises a two dimensional spatial impulse filter with good pulse fidelity, rapid cutoff at high frequency and minimal impulse response width, which is inserted in the compression/transmission/decompression path of the video signal prior to the compression stage. Because the video only passes through the encoder once in, for example, an Internet transmission channel, filters with good pulse fidelity are used in the present invention. Such filters are similar to gaussian impulse response filters or raised cosine amplitude response filters. One dimensional spatial filters of this kind applied in both vertical and horizontal directions combine to make a two dimensional spatial impulse filter with circularly symmetric impulse response and frequency response. Thus the diagonal response is the same as the vertical and horizontal responses, which results in the best visual use of bandwidth.

By way of illustration of the invention, a raised cosine filter which is 6 db down at the cutoff frequency of a sharp cutoff filter actually has a narrower impulse response and almost no ringing. However, 6 db down at the spatial band edge (half the pixel frequency of the video to be coded) is not enough to remove all alias frequencies. It has been found that moving the 6 db point of a pulse filter to about 0.7 (0.6 to 0.9) of the spatial band edge removes visible aliases in the image while being a good compromise between subjective image sharpness and total picture entropy, that is, the amount of information in the picture.

The two dimensional spatial bandwidth resulting from applying sharp cutoff filters with spatial bandwidth k both horizontally and vertically is $k^2$. The two dimensional spatial bandwidth resulting from applying an impulse filter with 0.7k bandwidth both horizontally and vertically is approximately $(Pi/8) * k^2$. Thus for images with uniform spectral content the pre-filtering of the present invention reduces the amount of information to be encoded by about 60%. This allows video to be transmitted down narrow band, that is low bit rate, digital channels with visually improved results.

The reason for visual improvement is that for typical image sequences sent on very narrow band data channels, at least this much information will be removed by the encoder anyhow. When the encoder removes a large amount of information it introduces blockiness and loss of resolution which is more objectionable than the resolution loss introduced by the pre-filter. It follows therefore that the invention provides the visually improved results by preventing blockiness while removing the large amount of high frequency information to enhance the compression process.

Further objects and advantages of the invention will be more fully understood and appreciated by reference to the drawings and the following description of the invention.

BRIEF DESCRIPTION OF THE FIGURES

FIG. 1 is a block diagram illustrating the application of the present invention to a narrow band channel, that is, a lower bit rate digital channel.

FIG. 2 is a block diagram illustrating an embodiment of the present invention.

FIGS. 2A and 2B are block diagrams illustrating alternative embodiments of the invention of FIG. 2.

DETAILED DESCRIPTION OF THE PREFERRED EMBODIMENTS

Figure 3:
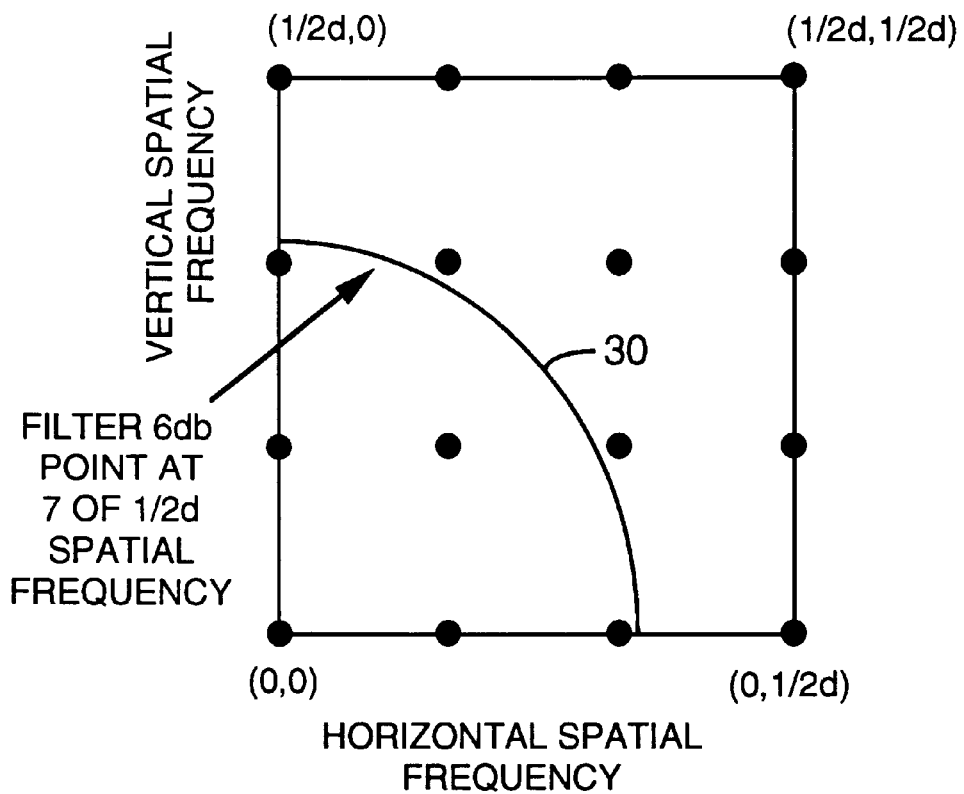
FIG. 3 is a diagram of a 4×4 pixel block illustrating the filter cutoff relative to discrete cosine transform (DCT) components in accordance with the invention.

FIG. 1 is a block diagram illustrating a compressed video system with spatial impulse filtering in accordance with the present invention. The environment of the compressed video system may comprise, for example, the Internet, a high definition television (HDTV) system, a digital video disc (DVD) processing system, etc. Therefore, although the invention is described herein with respect to primarily the Internet environment, it is readily adaptable for use in other applications. Likewise, although the invention is described in terms of video images, other forms of images such as computer data images, etc., can be processed using the invention techniques.

In FIG. 1, a suitable video source 12, such as a video camera, a scanning device, a prerecorded tape or memory device, etc., supplies video images herein termed, "input images," to a pre-compression spatial impulse filter means 14 of the present invention. The spatial impulse filter means 14 is a gaussian type filter such as a gaussian impulse response or raised cosine amplitude response filter, which has good pulse fidelity, rapid cutoff at high frequencies and minimal impulse response width. The filter means are applied in both the vertical and horizontal directions to provide the present invention as a two dimensional spatial impulse filter (depicted in FIG. 2), with circularly symmetric impulse response and frequency response. Therefore, in accordance with the invention, the diagonal impulse and frequency response is the same as the vertical and horizontal responses which results in the best visual use of bandwidth. The filtered images are then scaled to a smaller size in pixels compatible with the channel bandwidth, that is, the lower bit rate, with which they will be sent. The scaled down images are herein termed "output images."

It is to be understood that the invention operates in the digital domain, whereby the video images, etc., are digital signals. Likewise, since the pre-filtering and compression/decompression system preferably is a digital system, the narrow bandwidth system corresponding to the actual transmission channel is herein termed a lower bit rate channel or system.

The impulse spatial filter means 14 supplies the video output images, pre-filtered and scaled down to smaller size in accordance with the invention, to a generally conventional digital compression means 16, such as employed for example for streaming video over the Internet. The pre-filtered digitally compressed video images are transmitted, or otherwise transferred, to a use apparatus via a narrow bandwidth, that is, a lower bit rate digital channel 18, wherein the digital images are decompressed via decompression means 20. The decompressed digital video images of lower bit rate are supplied to suitable display means 22 such as a video monitor of a computer, video game device, etc.

However, in accordance with the invention, the pre-filtering, that is, the pre-compression filtering, with the subsequent scaling down, prior to the compression process, reduces the artifacts of compression introduced by the video compression and decompression processes, thus improving the apparent image quality.

FIG. 2 is a block diagram further illustrating the pre-compression spatial impulse filter means 14 of the present invention. The video images from the source 12, hereinafter termed "input images," are supplied to a two dimensional spatial impulse filter 15 with circularly symmetric gaussian impulse response. The two dimensional filter 15 preferably is realized using a combination of separate horizontal and vertical filters such as depicted in FIGS. 2A, 2B. However, the two dimensional filter 15 also may be realized without separate filters by implementing it as a two dimensional kernel, which is a more complicated and thus less practical implementation. The pre-filtered video images are supplied to a scaling means 28 comprising for example a poly-phase filter, which does the interpolation function required in scaling down to the smaller images, that is, the "output images," which are then compressed to the data rate suitable for a lower bit rate system FIG. 2A illustrates further details of the two dimensional filter 14 of FIG. 2. The input images from the source 12 are supplied to a horizontal impulse filter 24 which pre-filters in the horizontal direction, and thence to a vertical impulse filter 26 which pre-filters in the vertical direction. The filters 24, 26 have gaussian like response whereby their combination provides the basically circularly symmetric impulse and frequency response of previous mention, and thus the same response in the diagonal direction. As depicted in FIG. 2B, vertical filtering can be done before the horizontal filtering with the same effect. The pre-filtered output images provided via the separate filters 24, 26 in FIGS. 2A, 2B then are supplied to the scaling means 28 as depicted in FIG. 2.

FIG. 3 is a diagram depicting a filter 6 db point of the present invention relative to the DCT components for, for example, a 4 by 4 pixel block. The black dots represent the DCT component spatial frequencies, while the letter d is the pixel separation distance. As depicted, a 4 by 4 pixel block of the video image is transformed into its DCT components, resulting in a DC component at black dot (0,0) and then first, second, third, etc., order vertical and horizontal components.

In accordance with the invention, the two-dimensional impulse filter means is 6 db down at 0.7 of the Nyquist frequency, that is, ½d, where d is the pixel separation in the output image, as shown by the cutoff line 30 in FIG. 3.

Although the value 0.7 is used in this example, the value can range, for example, from about 0.6 to 0.9. The diagram thus portrays the relative positions of the DCT components with respect to the 6 db point. As shown, most of the DCT components fall outside of the 6 db point, which illustrates in turn the fact that the present filter gets rid of a large amount of image entropy.

Table I below is a matrix illustrating the magnitude of a two dimensional spatial filter with a 6 db point at ½d for equally spaced spatial frequencies between 0 and ½d in both the vertical and horizontal directions. If a spatial frequency exists in the image block, its magnitude will be multiplied by the magnitude of the filter. High magnitude spatial frequency components cause high order DCT components. The compression algorithm in the video codec will set many of the high order DCT components to zero. It is the setting of large DCT components to zero that causes the blocky artifacts in compression. Since the high order components are likely to be set to zero and these same components are greatly reduced by the pre-filter, blockiness in the picture is greatly reduced.

TABLE I

| 1.0 | 0.854553 | 0.533282 | 0.243026 |
|---|---|---|---|
| 0.854553 | 0.730262 | 0.455718 | 0.207679 |
| 0.533282 | 0.455718 | 0.28439 | 0.129601 |
| 0.243026 | 0.207679 | 0.129601 | 0.0590617 |

Figure 4:
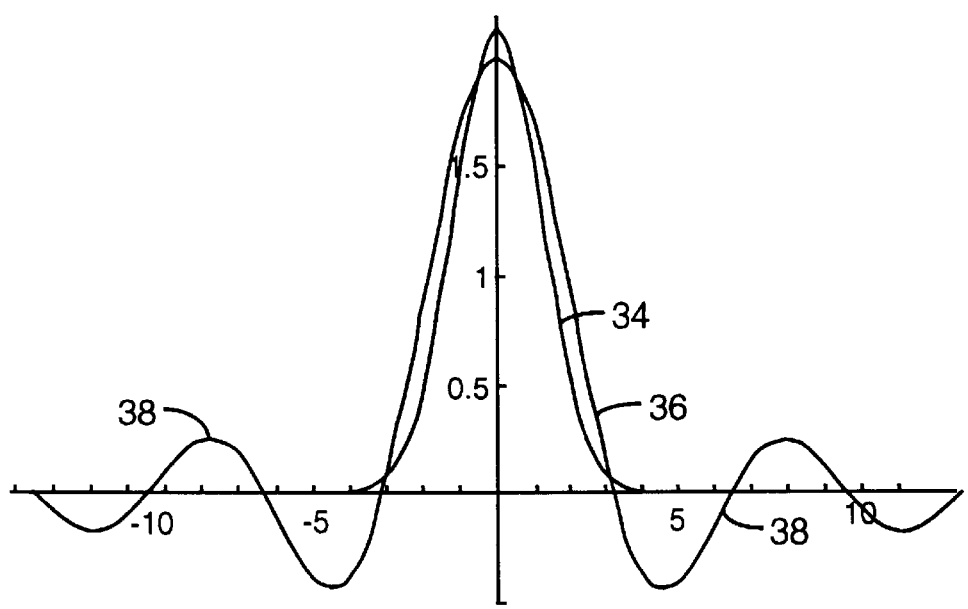
FIG. 4 is a graph illustrating the impulse response of a sharp cutoff filter in comparison with that of a gaussian-type filter of the invention with the same 6 db bandwidth.

FIG. 4 is a graph showing a comparison of the impulse response 36 of, for example, a sharp cutoff filter whose passband is normalized to 1 Hz, versus the impulse response 34 of an impulse filter means of the invention that is 6 db down at 1.0 Hz. Thus, the filters have the same 6 db bandwidth. As may be seen, even though the two filters have the same nominal bandwidth, the sharp cutoff filter has a wider impulse response 36, so has a wider blur function. More importantly, the sharp cutoff filter generates ringing, as shown by the oscillating curve portions 38 in FIG. 4. When using a sharp cutoff, a feature in one image block may cause a high frequency ring which extends into an adjacent image block.

On the other hand, the impulse filter means of the invention fails to generate ringing because it is a non-ringing filter as shown in FIG. 4, and thus for a given pulse width has less bandwidth. A non-ringing response is highly advantageous since ringing, which is high frequency, can extend from one block into an adjacent block as previously mentioned, and will be truncated in the adjacent block, resulting in the generation of a noisy block. It follows that the present impulse filter means does not generate DCT components which have to be dealt with across block boundaries.

Figure 5:
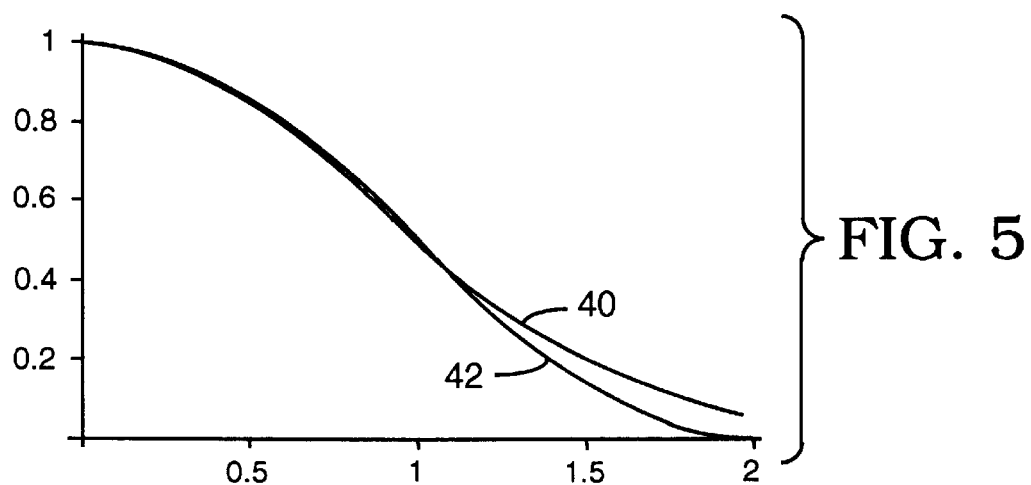
FIG. 5 is a graph comparing the frequency response of a gaussian filter to a raised cosine filter.

FIG. 5 is a graph showing a comparison of the amplitude response vs. frequency normalized to 0.5 (6 db down) at one hertz, of two different impulse filter means of the invention. A curve 40 depicts the frequency response of a gaussian filter and a curve 42 depicts the frequency response of a raised cosine filter. As may be seen, the respective responses are quite similar and either filter, or any linear phase filter with similar frequency response, can be employed to provide the pre-compression filtering of the present invention.

As may be seen from the above description, the impulse filter with the 6 db point moved to about 0.6 to 0.9 of the spatial band edge of the output image, is well suited in the transmission of compressed video images where the output image being sent is smaller than the input image captured by the image capture device, i.e., the image source. As previously discussed, the Internet is one such system, where the number of pixels in the transmitted output images is less than the pixels in the original input images.

By way of facilitating the description, the term "spatial band edge" is herein defined as ½d, wherein d is the separation between distinct pixels in the pertinent image. Ergo, the input and output image spatial band edges are defined herein as the band edges for the input and output image pixel densities (separations), respectively. In video cameras, the optical resolution can resolve spatial frequencies greater than the input image spatial band edge, i.e ½d where d is the pixel spacing in the input image sensor. These high spatial frequencies cause alias frequencies at spatial frequency k−½d where k is the spatial frequency of the optical image projected on the image sensor. These alias frequencies usually are not very disturbing in the picture but they increase the total amount of information that must be sent so they degrade the performance of compressed video systems. If the video image size is reduced by re-sampling at a lower pixel density, there is the possibility of introducing new alias components if there are signal components above the output image spatial band edge. In the present invention, the pre-filter is applied to the larger, i.e., "full," input image before it is re-sampled at the lower output image pixel density. Thus the pre-filter serves both as an anti-alias filter and as a filter for reducing the high frequency components applied to the encoder. The pre-filter is applied to full pixel resolution image but with a 6 db attenuation frequency of about 0.7 of the output image spatial band edge. The amplitude response of this pre-filter at spatial frequency of the output image spatial band edge is about 0.25, which is adequate to suppress aliases. This same pre-filter will also suppress the alias components introduced by the camera. If the output pixel density is half the camera pixel density, then a filter that is 0.7 of the output image spatial band edge frequency for transmission is 0.35 of the input image spatial band edge frequency for the camera. Since most of the camera aliases will be at higher frequencies because of optical resolution limits, those above 0.35 input image spatial band edge will be effectively removed by the pre-filter. When the output image pixel density is less than the input image pixel density, camera induced aliases can be reduced without loss of resolution in the output image.

When the pixel density is reduced, if the new density is not a submultiple of the original density, then a poly-phase interpolation filter must be used to determine the values at new pixels that lie between the old pixels. The poly-phase filtering is done after the bandwidth limiting pre-filter described above. Alternatively the poly-phase filter may be merged with the bandwidth limiting filter whereby both bandwidth limiting and interpolation are done together. Alternatively, some of the bandwidth limiting can be done by each. The last alternative is the easiest to implement when the poly-phase filter is a finite impulse response filter since this filter will have the fewest taps for a given quality when it has a modest amount of lowpass in its frequency response.

Although the invention has been described herein relative to specific embodiments, various additional features and advantages will be apparent from the description and drawings. For example, the pre-filter means are described as implemented in the digital domain, but could be implemented in the analog domain with charge coupled devices (CCDs). The CCDs may be disposed in the image sensor in a video camera. Likewise, the narrow bandwidth channel and the compression/decompression processes could be performed in the analog domain via suitable analog devices.

Thus the scope of the invention is defined by the following claims and their equivalents.

What is claimed is:

1. A method of minimizing visual artifacts generated when video images in a wide bandwidth system are compressed for use in a narrow bandwidth system wherein the wide and narrow bandwidth video images are full size input images and smaller size output images, respectively, comprising the steps of:

supplying the wide bandwidth full size input images;

applying two dimensional spatial impulse filtering with 6 db bandwidth substantially less than the spatial band edge for the images to be compressed, prior to compression of the video images, wherein the spatial band edge is ½d where d is the separation between distinct pixels in the images to be compressed;

scaling down the pre-filtered full size input images to provide the smaller size output images;

compressing the pre-filtered scaled down output images; and applying the scaled down compressed output images to said use in the narrow bandwidth system.

2. The method of claim 1 wherein:

the full size input images are supplied as arrays of pixels; and the substantial frequency rolloff in the step of pre-filtering is defined by the 6 db point being less than the spatial band edge of the smaller size output images.

3. The method of claim 2 wherein the 6 db point is down substantially less than about 0.6 to 0.9 of the output image spatial band edge.

4. The method of claim 2 wherein the narrow bandwidth system is the Internet.

5. The method of claim 2 wherein a high definition television system comprises the narrow bandwidth system supplied by a higher resolution input image scanning device.

6. The method of claim 2 wherein the narrow bandwidth system is a digital video disc processing system.

7. The method of claim 1, including setting high order discrete cosine transform components to zero which inherently causes blocky artifacts and loss of resolution in the video images of the narrow bandwidth system:

wherein the step of applying two dimensional spatial impulse filtering prior to the step of compressing removing the high order discrete cosine transform components prior to compressing to prevent the occurrence of the blocky artifacts and loss of resolution which would be caused thereby.

8. A method of improving the perceived image quality of a video signal supplied from a wide bandwidth system to a digital lower bit rate system comprising the steps of:

supplying input images having an input image pixel separation;

two dimensionally spatially impulse pre-filtering the input images at a 6 db bandwidth that is less than the spatial band edge for a resulting output image, prior to compressing the images;

scaling down the pre-filtered images to a smaller output image size appropriate for the lower bit rate system;

compressing the pre-filtered scaled down output images;

transmitting the compressed output images via the lower bit rate system;

decompressing the compressed output images; and displaying the decompressed output images with a pixel separation consistent with the output images, where the pixel separation of the output images is greater than that of the input images.

9. The method of claim 8 wherein the 6 db point is down by about 0.6 to 0.9 of the output image spatial band edge.

10. The method of claim 8 wherein the output image pixel density is a submultiple of the input image pixel density, and the step of scaling down includes sizing the output image to the smaller image size with less pixels and greater pixel separation by removing pixels.

11. The method of claim 8 wherein the output image pixel density is not a submultiple of the input image pixel density, and the step of scaling down includes a poly-phase interpolation filter to derive the output image.

12. The method of claim 11 wherein the poly-phase filtering is performed either after, or together with, the step of pre-filtering.

13. The method of claim 11 wherein the poly-phase filtering is performed via a finite impulse response filter which also performs some of the pre-filtering.

14. The method of claim 8 wherein the step of pre-filtering includes:

pre-filtering the output images in the horizontal and vertical directions in either order, to provide a basically circularly symmetric impulse and spatial frequency response.

15. An apparatus for improving the perceived quality of output images in a narrow bandwidth system, which output images are to be transmitted thereto from a wide bandwidth system of full size input images, comprising:

two dimensional spatial impulse filter means that are 6 db down at from 0.6 to 0.9 of the spatial band edge of the output image spatial band edge and receiving the wide bandwidth full size input images, for pre-filtering and downsizing the full size input images into the smaller down sized output images prior to compression;

compression means receiving the pre-filtered downsized output images for compressing the output images;

means for transferring the downsized compressed output images for use in the narrow bandwidth system;

means for decompressing the downsized compressed output images; and display means for displaying the decompressed output images in the smaller downsized image size.

16. The apparatus of claim 15 wherein:

said two dimensional spatial impulse filter means has a gaussian filter response which is substantially the same in the horizontal and vertical directions.

17. The apparatus of claim 16 wherein the two dimensional spatial impulse filter means include a gaussian impulse response filter or a raised cosine amplitude response filter.

18. The apparatus of claim 16 wherein the two dimensional spatial impulse filter means include a horizontal and a vertical spatial impulse filter, in either order.

19. The apparatus of claim 16 wherein the two dimensional spatial impulse filter means include a two dimensional kernel.

20. The apparatus of claim 15 including:

means responsive to the two dimensional spatial impulse filter means for scaling the pre-filtered image to a smaller output image size compatible with the narrow bandwidth application.

21. The apparatus of claim 20 wherein the means for scaling include poly-phase interpolation filter means.

22. The apparatus of claim 15 wherein the filter means and the compression and decompression means are digital, and the narrow bandwidth system is a digital lower bit rate system.

23. A method of maximizing perceived quality of images when transferring original input images of full size to a digital lower bit rate system of smaller size output images, comprising the steps of:

pre-filtering the input images of the wide bandwidth system via a circularly symmetric two dimensional spatial impulse filter wherein the 6 db point is substantially less than the output image spatial band edge, prior to compressing the output images;

scaling down the input image size of the wide bandwidth system to the smaller output image size of the digital lower bit rate system after the step of pre-filtering;

compressing the pre-filtered scaled down output images;

transferring the compressed output images via the digital lower bit rate system; and decompressing and displaying the decompressed output images in the smaller image size with the maximized perceived quality.

24. The method of claim 23, wherein the two dimensional spatial impulse filter means is 6 db down at about 0.6 to 0.9 of the output image spatial band edge, with a generally circularly symmetrical frequency response.

25. The method of claim 24, wherein the two dimensional spatial impulse filter means is a gaussian type filter with good pulse fidelity, rapid cutoff at high frequency and minimal impulse response width, with little or no ringing.

26. A method of improving the perceived image quality of full size input images of a video signal when digitally compressed and transmitted to a digital lower bit rate system as smaller size output images, comprising the steps of:

two dimensionally spatially impulse pre-filtering the full size input images at full size with the resolution of the smaller size output images; and scaling down the full size pre-filtered images to provide the smaller size output images for compression, transmission and decompression in the smaller image size with the improved perceived image quality.

27. The method of claim 26 wherein:

the input images are pre-filtered at a 6 db bandwidth that is substantially less than the spatial band edge for the output images, prior to scaling and compressing the output images; and the spatial band edge is ½d, where d is the separation between distinct pixels in the output image.

28. The method of claim 27 wherein the 6 db point is down by about 0.6 through 0.9 of the output image spatial band edge.

29. Apparatus for improving the perceived image quality of a video signal when compressed and transmitted to a lower bit rate system as smaller size output images, comprising:

two dimensional spatial impulse filter means receiving the input images at full size, for pre-filtering the full size input images at the resolution of the smaller size output images;

scaling means receiving the pre-filtered images for scaling the output images down to the smaller size;

means for compressing the smaller size output images; and said lower bit rate system including transmission and decompression means for providing the smaller size output images at the improved perceived image quality.

30. The apparatus of claim 29, wherein the filter means are 6 db down at from 0.6 through 0.9 of the spatial band edge of the output images, wherein the spatial band edge is ½d where d is the separation between distinct pixels in the output image.

* * * * *